Nov. 5, 1935.  G. R. HAUB  2,020,143
GLASS FEEDER
Filed July 30, 1932  2 Sheets-Sheet 1
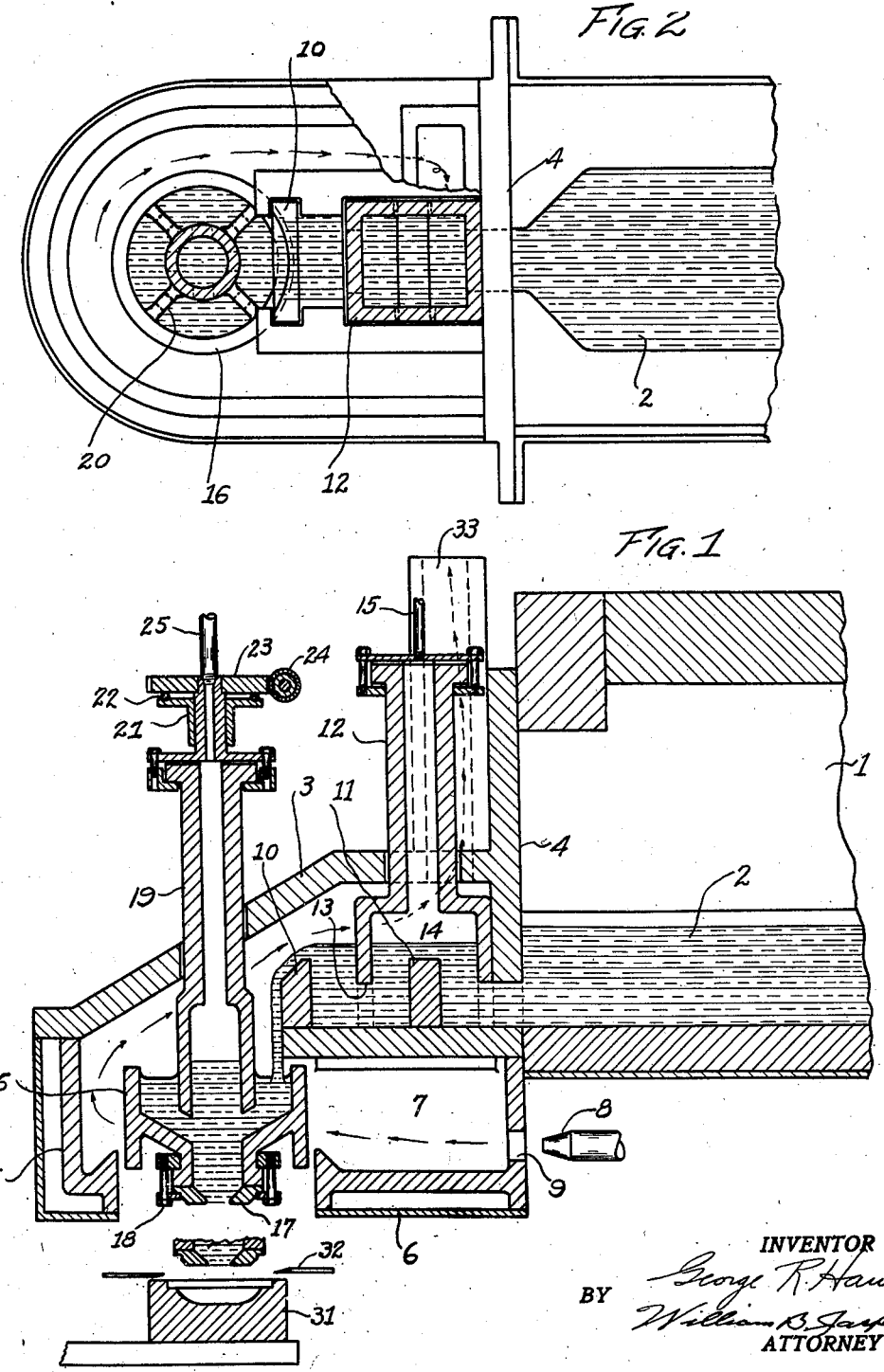

Nov. 5, 1935.  G. R. HAUB  2,020,143
GLASS FEEDER
Filed July 30, 1932  2 Sheets-Sheet 2
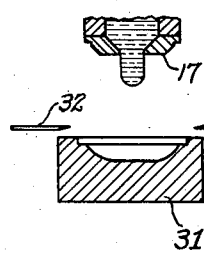
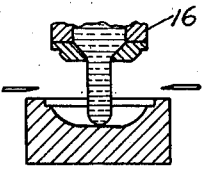
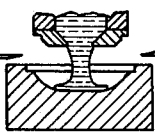
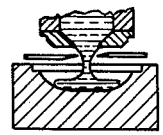
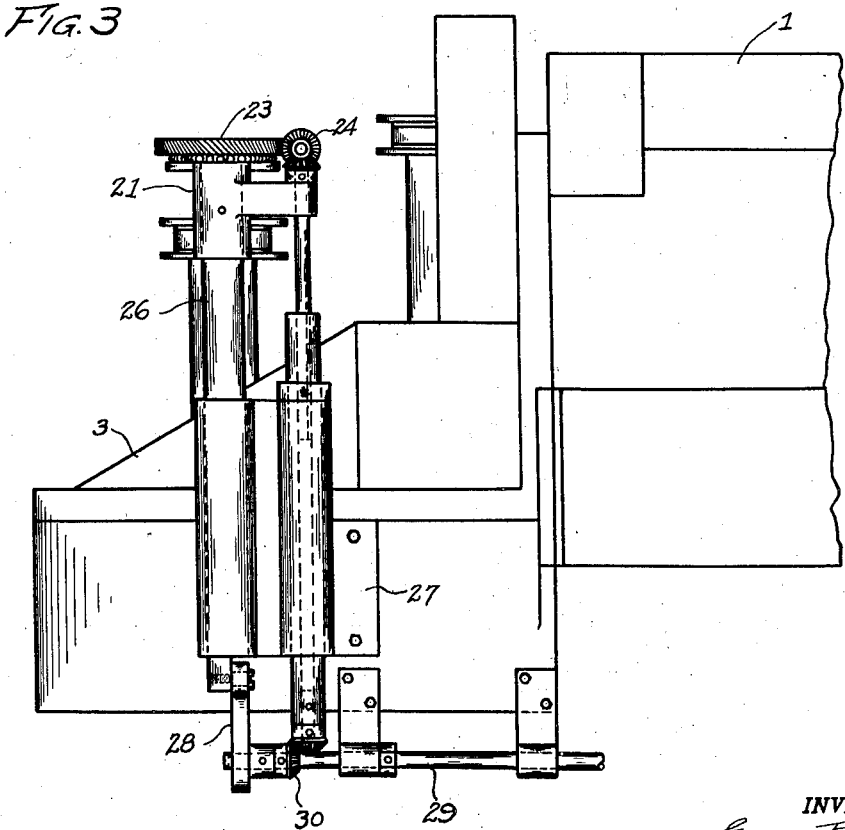
INVENTOR
George R. Haub
BY
William B. Jaspert
ATTORNEY Patented Nov. 5, 1935

2,020,143

UNITED STATES PATENT OFFICE 2,020,143

GLASS FEEDER

George R. Haub, Crafton, Pa.

Application July 30, 1932, Serial No. 626,891

10 Claims. (Cl. 49—55)

This invention relates to improvements in apparatus for feeding molten glass to molds especially for making pressed ware and it is among the objects thereof to provide means for delivering thermally and physically conditioned glass of uniform quality in regulable weight to the molds of ware-forming machines and which shall be adapted to center the charge of the glass in the mold as it is being fed thereto.

A further object of the invention is the provision for regulating the flow of the glass from the melting chamber to the feeding implement and to maintain the glass at proper working temperature in said implement after it has been delivered thereto.

In feeding glass to the molds of the ware-forming machines, it is customarily extruded from a discharge orifice and sheared off causing it to drop in the matrix of the mold, and in as much as the shape of the glass gob thus produced is irregular, it will not spread out in the center of the mold but will ordinarily be displaced to one side with the result that when the ware forming plunger is pressed on the glass, it will fill up one side of the mold and sometimes cause displacement of the mold ring and will produce irregularly shaped ware.

In accordance with the present invention, the glass gob is centered with the center of the mold and is not severed until after it has been partially spread in the mold so that after it is sheared, it is in proper position for pressing.

In the accompanying drawings constituting a part hereof and in which like reference characters designate like parts;

Figure 1 is a vertical cross-sectional view of a glass feeding apparatus embodying the principles of this invention and illustrating a portion of the glass melting tank;

Figure 2 is a top plan view thereof partially in section;

Figure 3 is a side elevational view of the feeding apparatus of Figure 1; and,

Figure 4 to 7 inclusive are cross-sectional views diagrammatically illustrating the feeding of the glass gob and the centering thereof in the ware forming mold.

With reference to the several figures of the drawings, the structure therein illustrated comprises a forehearth 1 forming an extension of a glass melting tank in which the molten glass 2 is contained at proper working temperature within a top, bottom and side closure. Attached to the forehearth structure is a feeder boot 3 which forms a partition wall 4 that partially extends into the glass 2 and the front of the boot is provided with a muffle 5 for reducing the heat losses. The member 5 is designed to extend horizontally in alinement with a casting 6 which is of hollow construction and constitutes a heating chamber 7 which is heated by a burner 8 projecting through the burner port 9. The hearth of the feeder 1 extends above the heating chamber 7 and is provided with a plurality of baffles 10 and 11 which are disposed in the path of the glass flow.

A stationary weir 12 of hollow construction is placed over the baffle member 11 and is provided with a cut out portion 13 to permit the flow of glass into the hollow chamber 14 of the weir and around the baffle member 11. The hollow weir is provided with a conduit 15 through which fluid pressure is applied to the inner chamber 14 to act as a restraining means for controlling the flow of the glass from the glass pool 2 over the edge of the baffle block 10 into the feeding implement which is generally designated at 16.

The feeder comprises a refractory member of substantially cylindrical form, the bottom of which is provided with an orifice ring 17 which is secured thereto by clamping bolts 18, and the member 16 is integrally formed to a cylinder 19 to which it is connected by spiders 20 shown in Figure 2 of the drawings.

The cylinder 19 is supported on a bearing bracket 21 by anti-friction rollers 22 and is adapted for rotation through a worm gear and worms 23 and 24 respectively. A cylinder 19 connects through conduit 25 with a source of positive and negative pressures to apply impulses to the surface of the glass contained in the implement 16.

The feeding implement 16 and the cylinder 19 are subjected to vertical movement by virtue of their support in the bracket 21 which is carried by a post 26 adapted for sliding movement in a bracket 27 through a lifting cam 28. The cam is actuated by a shaft 29 which is also geared through bevel gears 30 to the worm 24.

Shaft 29 may be operated in synchronism with the movements of the ware forming machine which carries a series of molds 31, Figures 4 to 7, and a pair of shears 32 are also actuated by connection with the machine and feeder movements to synchronize them to cut off the glass gob at the proper time.

The operation of the above described mechanism is briefly as follows:

The molten glass 2 is regulated in its flow through the hollow weir 12 by the application of fluid pressure through the conduit 15 so that a regulable amount of glass will flow over the block 10 into the feeding implement 16.

The burner 8 heats the chamber 7 and the products of combustion are drawn around the feeding implement 16 as indicated by the arrows and drawn upwardly through a flue or stack 33 thus maintaining the refractory material of the feeding implement at substantially the same temperature as the molten glass which is fed thereto.

When the feeding apparatus is set in motion through rotation of the shaft 29, the implement 16 will revolve slowly by virtue of its gear connection through the worm 23 with the shaft 29 so that the glass is uniformly distributed in the feeder and the entire feeding implement is subjected to oscillating motion on its vertical axis through the cam member 28.

The ware-forming machine is synchronized in its movement with the vertical movement of the feeder so that the molds 31 are brought in alinement with the orifice ring 17 of the feeder at the time the feeder is subjected to its downward movement at which time the glass in the hollowness of the cylinder 19 is subjected to air pressure through conduit 25.

The application of the pressure is regulated through cam mechanism (well known) which is controlled by the movement of the ware forming machine or the movement of the feeder so that the air pressure of the glass will cause an extrusion of a glass gob from the orifice ring 17 in excess of the natural flow of the glass by gravity.

This principle of producing a relatively large gob of a given shape by air pressure is well known in the art and constitutes no part of the present invention.

As the gob is extruded at the orifice ring 17, as shown in Figure 4 of the drawings, the feeder head is lowered by gravity, governed by cam 28 to the position shown in Figure 5, while the air pressure is still maintained in the cylinder 19. Upon further movement of the head, the gob will spread in the center of the mold 31 as shown in Figure 6, and when a sufficient quantity of glass has been extruded, the pressure is cut off on conduit 25 and negative pressure or suction is applied which causes a necking of the gob as shown in Figure 7 of the drawings.

At the instance of necking, the shears 32 are caused to sever the connecting strand of the glass between the portion which has been spread and centered in the mold and the portion retained in the orifice ring. With the severing of the glass, the head 16 is caused to raise by action of cam 28 and the mold 31 is caused to pass underneath the pressing plunger by movement of the machine, at the same time bringing another empty mold in register with the discharge orifice of the feeder.

It is evident from the foregoing description of the invention that glass feeding mechanism constructed in accordance therewith provides positive means for centering the glass in the mold and assures that glass of suitable quality and in regulated quantities is at all times available at the feeding orifice.

By maintaining the refractory material of the feeder head 16 at substantially the same temperature as the working glass, the control of the glass flows is very much simplified and maintained positive during the operation of the feeder. The regulation of the size of the gob and mass of glass is controlled by the degree of pressure applied to the interior of the cylinder 19, or in other words, on the surface of the glass acted upon.

I claim as my invention:

1. Apparatus for feeding glass to a ware-forming mold comprising a vertically reciprocating cylinder having a container at the bottom for supporting a pool of glass and having a portion of the cylinder disposed below the surface of said glass pool for the application of pressure to a restricted portion of the surface of the glass in the container.

2. Apparatus for feeding glass to molds of a ware-forming machine comprising a cylindrical container for independently supporting a glass pool therein having a cylinder formed integrally therewith and submerged below the surface of the glass pool, and means for applying negative and positive pressures to the surface of the glass confined by said cylinder.

3. Apparatus for feeding glass to ware-forming machines comprising a cup-shaped feeding implement for supporting a pool of glass having a hollow cylinder integrally formed therewith and projecting below the surface of the glass contained therein, and means for subjecting said implement to reciprocating movement in a vertical direction while maintaining the flow of glass to the glass pool from a supply source.

4. Apparatus for feeding glass to ware forming machines comprising a container for supporting a pool of molten glass having a feeding orifice at the bottom thereof and having a sleeve extending below the normal level of the glass in said container, means for supplying a continuous stream of molten glass to said container, means for rotating said container, and means for subjecting said container and sleeve to reciprocatory movement, while subjecting the glass in the pool above the feeding orifice to pressure impulses.

5. Apparatus for feeding glass to ware forming machines comprising a forehearth structure having an extension thereon with an overflow wall at the end thereof, a container for supporting a pool of glass below said overflow wall having a feeding orifice at the bottom thereof and having a sleeve extending upwardly therefrom, such sleeve having its lower end extending a substantial distance into said container below the level of the glass contained therein, a hollow weir in said forehearth extension having its bottom portion submerged below the surface level of the glass, a baffle member disposed in said weir extending from the bottom of the extension into the hollowness of said weir, fluid pressure means for exerting pressure on the surface of the glass container in said weir, and means for directing fluid pressure impulses to the surface of the glass contained in the sleeve of said container, the fluid pressure means acting on the glass in said weir to control the amount of overflow from said forehearth extension to the container and the fluid pressure impulses in said sleeve being operative to segregate mold charges of predetermined weight and shape from the mass of glass in said container.

6. Apparatus for feeding glass to ware forming machines comprising a forehearth structure containing a pool of molten glass having an extension thereon with a dividing wall having a passage to cause the flow of glass from the forehearth to said extension, a baffle wall interposed between said partition wall and the end wall of said extension, a hollow weir disposed over said baffle wall and connected to a source of fluid pressure for exerting pressure on the glass above said baffle to regulate the amount of glass flowing to the end wall of said extension, a housing surrounding said extension and a portion of said weir, and having a heating chamber at the end and below the forehearth extension, a container for receiving the glass flowing over the extension wall disposed below said wall and within said heating chamber, said container having a feeding orifice at the bottom thereof, and means for heating the chamber below the forehearth extension and said extension chamber whereby the container is maintained at substantially the temperature of the glass.

7. Apparatus for feeding glass to ware forming machines comprising a forehearth structure having an extension with an overflow wall at the end thereof, a heating chamber surrounding said extension and projecting therebeyond, a container disposed within the projected portion of said heating chamber having a feeding orifice at the bottom thereof and having a cylinder with the bottom portion submerged below the level of the glass in said container, said cylinder having connections with a source of positive and negative pressure impulses, means for heating the chamber beneath said forehearth extension and around said container as well as above the container and said forehearth extension, means for regulating the volume of glass flowing through said extension into said container, and means for subjecting said container to rotary and reciprocatory movement.

8. Apparatus for feeding glass to ware forming machines comprising a container for supporting a pool of molten glass having a feeding orifice at the bottom thereof and having a cylinder extending thereon, said cylinder being open at its bottom portion and submerged below the level of the glass in said container, and having connection at its top with a source of fluid pressure impulses, means for feeding glass to said container in a continuous stream, means for subjecting said container to rotary movement, and means for lowering said container and sleeve during the application of positive pressure to the glass in said container and subsequently to return said container and sleeve to their upper position, said container and a portion of said sleeve being housed in a heating chamber when in their raised position, and means for heating said chamber to maintain the container and glass contacting portion of the sleeve at substantially the desired working temperature of the glass.

9. The step in the method of feeding glass to a ware forming machine which comprises controlling the rate of glass flow by directing the glass flow from a forehearth through a flow passage in a continuous stream and subjecting a restricted portion of the surface of the glass to constant superatmospheric air pressure to regulate the rate of flow through said restricted portion.

10. In the method of feeding glass to a ware forming machine, the step which comprises controlling the rate of glass flow by directing the flow of glass from a glass pool into a pressure chamber, causing the glass to flow in a continuous stream through said chamber and subjecting the glass within said chamber to continuous superatmospheric air pressure to control the rate of flow from said chamber.

GEORGE R. HAUB.